W. FULTON.
Lamp Burner.
No. 1,047. Reissued Sept. 25, 1860.
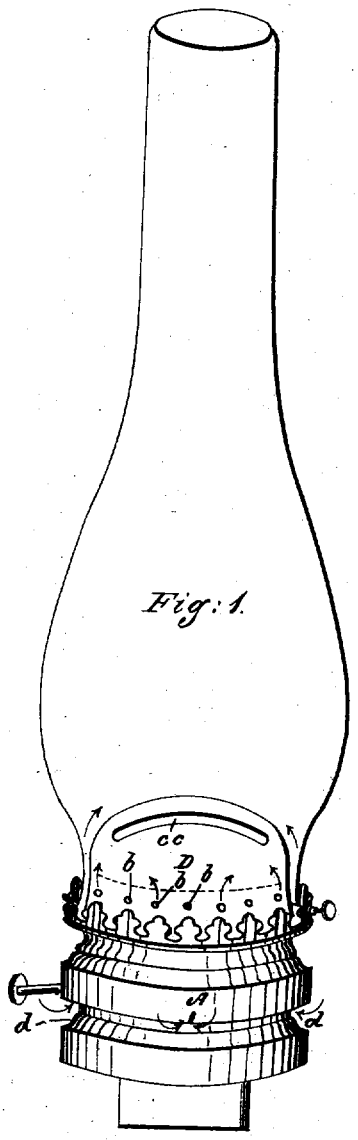
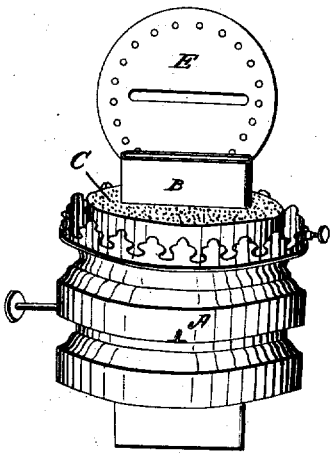
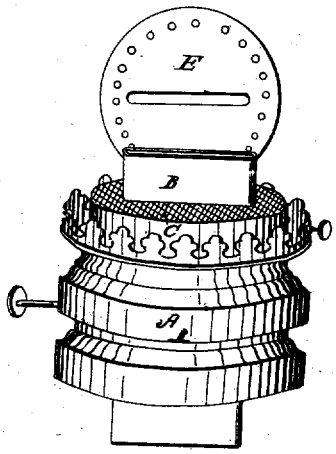
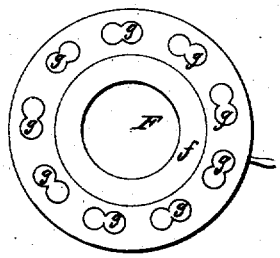
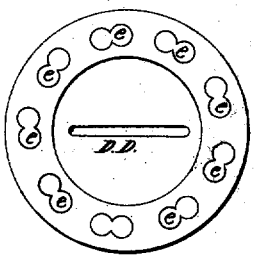
Witnesses:
R. McC. Shepherd.
Isaac Van Nostrand
Inventor:
Wm Fulton
N. PETERS, Photo-Lithographer, Washington, D. C.

UNITED STATES PATENT OFFICE.

WILLIAM FULTON, OF CRANBERRY, NEW JERSEY.

IMPROVEMENT IN LAMPS.

Specification forming part of Letters Patent No. 21,069, dated August 3, 1858; Reissue No. 810, dated September 13, 1859; Reissue No. 1,047, dated September 25, 1860.

*To all whom it may concern:*

Be it known that I, WILLIAM FULTON, of Cranberry, in the county of Middlesex, in the State of New Jersey, have invented a new and Improved Lamp-Burner; and I do hereby declare that the following is a full, clear, and exact description of the same, reference being had to the accompanying drawings, and to the letters of reference marked thereon, making a part of this specification, in which—

Figure 1 is an external view of my invention with the glass chimney applied to it. Fig. 2 is also an external view with the cap raised so as to expose the wick-tube and the perforated plate when used as an air-distributer. Fig. 3 is also an external view with the cap raised so as to expose the wick-tube and the gauze wire when used as an air-distributer. Fig. 4 is a detached view of the movable plate of the register. Fig. 5 is an inverted plan of my invention, showing the stationary portion of the register.

Similar letters of reference indicate corresponding parts in the several figures.

This invention relates to an improvement in lamps for burning coal-oils and other substances that are rich in carbon, and which require a considerable amount of oxygen to support a proper combustion for illuminating purposes.

The object of the invention is to adapt a lamp for burning equally well all the different substances above named, however much they vary as regards the proportion of carbon they possess. This object is attained by applying a register to the bottom of the burner, and using in connection therewith a perforated plate or gauze wire, so as to regulate the elastic force of the air, that it may be presented evenly to the flame, the different parts being so arranged that a greater or less amount of oxygen is admitted to the flame, according to the amount of carbon the burning material possesses, a complete combustion of its elements being thereby effected, and a flame of the greatest illuminating power obtained.

To enable those skilled in the art to fully understand and construct my invention, I will proceed to describe it.

A represents the bottom of my burner, which may be fitted on a reservoir or fountain of the usual or any proper form. This bottom is constructed of sheet metal, any of the ordinary materials being used.

B is the wick-tube, which is of oblong form to receive what is generally known as the "flat wick." This wick-tube, instead of passing through a solid metal plate, as usual, passes through a perforated plate, as shown at C in Fig. 2, or a gauze wire, which is plainly shown at C in Fig. 3. Cap D shuts down over it, as shown in Fig. 1, the tube coming within three-eighths to a half an inch of the top of the cap. The perforated plate or gauze wire C does not afford a communication with the reservoir below and the flame, for a plate, D D, (see Fig. 5,) closes the lower end of the cap, the wick-tube passing through said plate. (See Fig. 5.)

On the upper part of the bottom A a cap, D, is placed and attached by a hinge or joint, so that it may readily be turned back to fully expose the wick-tube, as shown at E in Figs. 2 and 3, or turned forward so as to cover it, as shown in Fig. 1. Through the lower part of this cap D openings *b* are made, said openings extending all around the cap, and an oblong slot, *c c*, is made through the top of the cap.

The external air passes through the bottom D D at *e*, as shown in Fig. 5, or as indicated by the arrows in Fig. 1, and through the openings *g* in regulator F, as shown in Fig. 4, and then passes through the perforated plate or gauze wire C, as shown in Figs. 2 and 3, by which means it is presented evenly to the flame and distributed equally in the top of the cap D. It then passes through the openings *b* in the lower part of cap D, helping to support combustion and keep the shade cool. The remainder passes through the slot *c c*.

Within the bottom A, and just above or over the perforated portion *e*, a perforated plate, *f*, is placed, as shown in Fig. 4. This plate is allowed to turn within the bottom A, and its holes *g* are made to wholly or partially register with the openings *e*. The perforated plate *f* and the perforated portion of the bottom form a register to regulate the admission of air to the flame.

By this invention more or less air may be admitted to the flame, as may be desired. If the material to be burnt is very rich in carbon—as camphene, for instance, or rosin-oil—the register is left entirely open; if coal-oils are used the register is turned to reduce the volume of air which is admitted to the flame, as the latter material contains less carbon than the former, and if a mixture of coal and whale oils is used—a mixture containing still less carbon—the register may be turned to still further reduce the volume of air. The perforated plate or gauze wire C, as shown in Figs. 2 and 3, adds greatly to the efficiency of the device, it having a tendency to equalize the draft, causing it to impinge upon the flame all round with equal intensity.

Without the perforated plate or gauze wire C, or its equivalent, it is impossible to obtain a perfect combustion from a large-size burner. The perforations *b* in the lower part of cap D admit a current of air each side of the cap, as indicated by the arrows.

This invention is important, for many burning materials are now sold which differ only in the amount of carbon they contain, and which can only be perfectly consumed by a proper admission of air to them. Articles of the same name—as coal-oil, for instance—frequently differ in this respect, and hence a perfect or good illuminating-flame has not hitherto been obtained at all times.

I am fully aware that perforated plate and gauze wire have been used in miners' lanterns, and that holes have been made in the caps of camphene-lamps for round wicks many years ago, but I am not aware that they have ever been used in connection for the herein-described purpose prior to my invention.

Having thus described my invention, and the manner in which the same is or may be used or carried into effect, I would observe in conclusion that I do not confine or restrict myself to the precise form or position of the several plates which I have had occasion to describe or refer to, as variations may be made therefrom without deviating from the principles or main features of my said invention; but

What I consider to be novel and original, and desire to secure by Letters Patent, is—

1. The perforated plate C or the gauze wire C for the purpose of regulating the elastic force of the air so that it may be presented evenly to the flame, or their equivalent.

2. The perforations *b* in the lower part of cap D, as shown in Fig. 1, in combination with the perforated or air-distributing plate C or the gauze wire C, or their equivalent.

3. The register formed of the perforations *e* in the bottom A, as shown in Fig. 5, in combination with the perforated plate or gauze wire C and the holes *b* in the lower part of cap D, as shown in Fig. 1, the whole being arranged substantially as and for the purpose herein described.

WM. FULTON.

Witnesses:
R. McC. SHEPHERD,
ISAAC VAN NORSTRAND.